June 18, 1968  J. P. MERCER, JR  3,388,581

METHOD OF FORMING A ROTARY CUTTER BLADE

Filed Aug. 23, 1965

INVENTOR
JULIAN P. MERCER, JR.

BY Newton, Hopkins,
Jones & Ormsby

ATTORNEYS

United States Patent Office 3,388,581
Patented June 18, 1968

3,388,581
METHOD OF FORMING A ROTARY
CUTTER BLADE
Julian P. Mercer, Jr., 2914 Macon Road,
Columbus, Ga. 31906
Filed Aug. 23, 1965, Ser. No. 481,744
4 Claims. (Cl. 72—324)

ABSTRACT OF THE DISCLOSURE

A method of forming a rotary cutter blade comprising cutting a plurality of straps of metal from a larger piece of metal, bending the straps at two positions to form parallel end portions, sharpening an edge of one end portion and forming a hole in the other end portion. The hole is formed by forging a circular area of the metal which is displaced from the end and edges of the strap to reduce the thickness in the area of the strap and enlarge the width of the strap about the area. The metal remaining in the area after forging is removed.

---

In order to be effective to cut grain, grass or the like, a lightweight rotary cutter blade must rotate at a high angular velocity to develop a high rotational inertia, somewhat like a fly wheel, so that the inertia of the blade rather than its driving mechanism is the blade's primary cutting force. Of course, its high velocity causes the blade to rotate several times over any given area over which it is pulled by the farmer and the higher the angular velocity of the blade in comparison to the speed with which the farmer pulls it over the crop, the smaller amount of crop the blade will cut on each revolution. Thus, the cutting of the crop is confined to the outer portion of the cutting edge of the blade, which increases the effective length of the lever arm of the blade, between its outer cutting edge and its center of rotation. This long lever arm causes any forces on the outer cutting edge of the blade that are not effectively overcome by the blade inertia to exert a torque on the driving mechanism at the blade center, and since rotary cutter blades of the type utilized in the farmer's field quite frequently meet with obstructions in the field such as stumps, roots, rocks, clods of dirt, and thick vegetation that are effective to overcome blade inertia, the blade is most vulnerable at its pivot point when the high velocity of the blade is abruptly slowed or stopped by impact at the periphery of the blade, or at the end of its lever arm, whereupon forces are transmitted through the length of the blade to its pivot point. Because of the usual high rotational velocity of the blade, the length of its lever arm to the center of rotation upon encountering an obstruction and due to the fact that a portion of the blade is usually removed at its center of rotation to form the hole through which the shaft of the driving mechanism of the mower extends, which weakens the blade at this point, the blade tends to split, crack or break in its area around its hole, or center of rotation.

In order for the blade to resist damage in this manner, it has become common practice to make that portion of the blade surrounding its pivot point or center of rotation larger than the remaining portion of the blade. The usual practice has been to form an elongated blade having a circular expansion near the portion through which the hole extends; the expansion surrounding the hole so that a bulk of metal is present in the weakest point of the blade.

While forming rotary cutter blades with an expanded portion surrounding its pivot point has been successful in strengthening the blade, the formation of blades in this manner has been expensive. While the weaker straight blades can be stamped out of a piece of metal with a small distance separating each stamping, the extra bulk required in the stronger blades around the center of rotation of the blade projects outwardly of the blade so that more distance is required between each stamping, whereupon a large amount of metal is left over from between each blade stamping.

Accordingly, this invention involves a method of forming a rotary cutter blade having an enlarged area about its connecting hole from a substantially rectangular piece of metal by forging the area to be removed to form the hole until only a small amount of material remains in the hole area and the area surrounding the hole area is expanded, and then punching out the material remaining in the hole area.

Thus, it is an object of this invention to provide a simple and economical method of forming a rotary cutter blade, and which forms a blade that is strong and durable, and which resists cracking and splitting near its axis of rotation.

Another object of this invention is to provide a method of forming a rotary cutter blade having an enlarged area around its axis of rotation from a substantially rectangular piece of metal.

Other objects, features and advantages of the present invention will become apparent upon reading the following specification, taken in conjunction with the accompanying drawing, in which.

Figure 1:
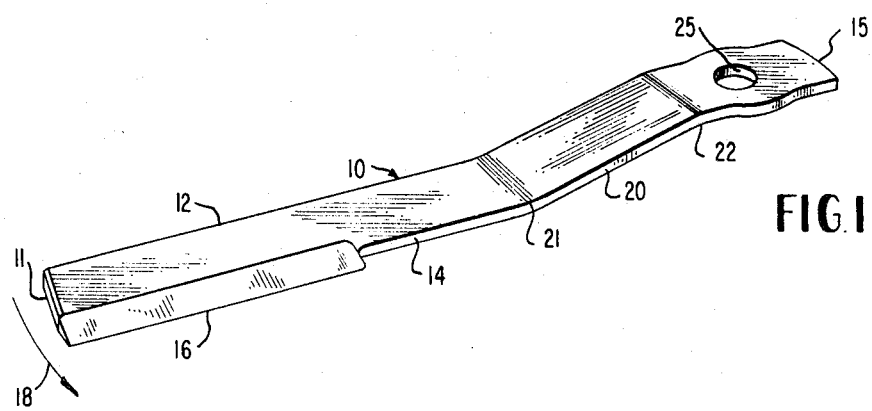
FIG. 1 is a perspective view of the rotary cutter blade formed by the method of this invention.

Referring now more particularly to the drawing, in which like numerals indicate like parts throughout the various figures, the rotary cutter blade 10 which is formed by this process has an outer or peripheral tip or end 11, a trailing edge 12, a leading edge 14, and a pivotal end 15. The leading edge 14 is formed with a sharpened outer edge 16 which is arranged to engage the farmer's crop upon rotation. The blade 10 is constructed to rotate in the direction of the arrow 18. An inner portion 20 of the blade 10, near the pivotal end 15, is bent at 21 and 22 so that the cutting edge 16 is disposed parallel to but lower than the pivotal end 15 of the blade. In this manner the blade can be attached at its pivotal end 15 to a device extending thereabove so that the cutting edge 16 will cut in a plane removed downwardly from the pivotal end 15. This arrangement is desirable so that the axle of the apparatus utilized to rotate the blade can extend through the pivotal end of the blade, through the hole 25, and still remain displaced from the cutting plane of the blade.

The blade 10 is formed from a substantially rectangular piece of metal by forging the cutting edge, bending the inner portion 20 at 21 and 22, and by forging the area to be removed to form the hole 25 until only a small amount of metal remains therein, whereupon the metal is removed.

Figure 2:
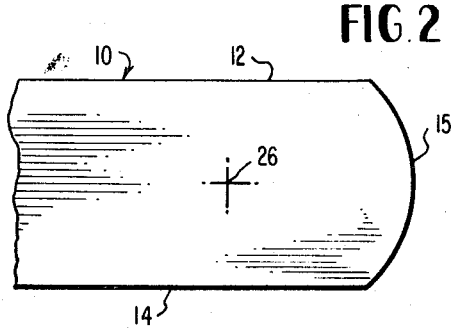
FIG. 2 is a partial plan view of the piece of metal from which the blade is to be formed, the end being shown being that end to which the hole is to be cut.
Figure 3:
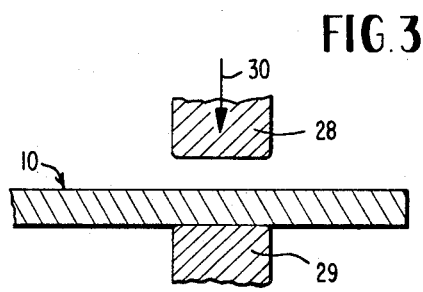
FIG. 3 is a cross sectional view in elevation of the end of the blade shown in FIG. 2, and the method in which the forging apparatus is employed to form the hole in the blade.
Figure 5:
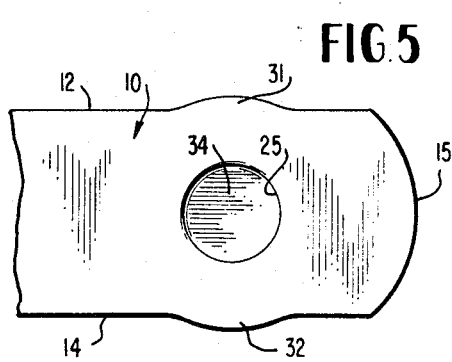
FIG. 5 is a plan view of the end of the blade, taken along lines 5—5 of FIG. 4.
Figure 6:
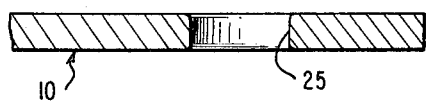
FIG. 6 is a cross sectional view in elevation of the rotary cutter blade, showing the method with which the material remaining in the hole is removed after the forging operation.

As is best shown in FIG. 2, a point 26 which is located intermediate the trailing and leading edges 12 and 14, respectively, and a distance from the pivotal end 15 of the blade which is slightly longer than twice the diameter of the hole 25 is selected for the center of the hole. Apparatus 28 and 29 for forging the hole area is positioned over the point 26 so that the area surrounding it can be compressed by a force as indicated by the arrow 30. The force of the apparatus 28 and 29 is such that the metal squeezed therebetween escapes to the periphery of the hole, thereby enlarging the metal surrounding the hole, as shown in FIG. 5. Thus, the sides of the blade immediately adjacent the hole 25 are enlarged at 31 and 32 by the natural flow of metal escaping from between the apparatus 28 and 29, and the grain orientation of the metal surrounding the hole is altered to some extent so that it tends to encircle the hole. Of course, the reorienting the grain and bulging the sides of the blade are achieved without any shearing of the metal.

Figure 4:
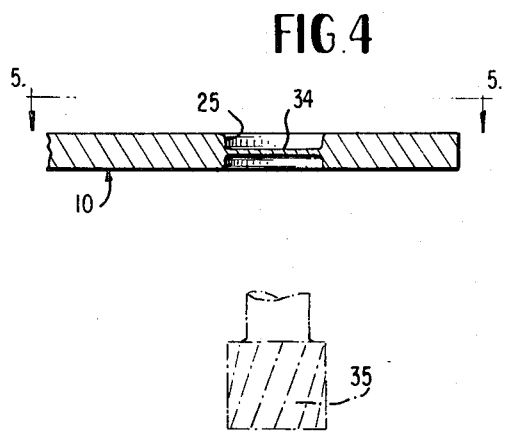
FIG. 4 is a cross sectional view in elevation of the blade, showing the blade after the forging operation is complete.

After the blade has been treated by the apparatus 28 and 29 until it takes the configuration shown by FIGS. 4 and 5, the portion 34 of the metal in the vicinity of the point 26 that remains after the forging operation is cut away by the cutting device 35 in the usual manner. Of course, care is taken so that the cutting device 35 is approximately the same size as the forging apparatus 28 and 29 so that only that portion 34 of the metal remaining in the hole after the forging operation will be removed.

With this method of forming the hole 25 in the blade 10, it can be seen that the blade is enlarged at 31 and 32 in the vicinity surrounding the hole 25 so that the blade is enlarged around the hole. This enlarged portion strengthens the blade in the vicinity of the hole. Furthermore, since the enlarged portion around the hole was formed from the natural flow of the metal escaping between the forging apparatus 28 and 29, which is not detrimental to the grain structure of the blade, and since the grain structure is reoriented to extend around the hole, it can be seen that the treatment of the blade by the forging apparatus is done without any detrimental effect on the grain of the metal so that the blade retains the full strength of the metal in the vicinity of the hole 25.

Since the blade 10 is formed from a substantially rectangular piece of metal it can be seen that the blades can be initially cut apart from a large piece of metal with substantially no wastage of metal as might be encountered if the blade had to be cut with the enlarged portions 31 and 32 already thereon. This, of course, saves a substantial amount of material that might ordinarily be lost in the formation of the blade when initially cutting the rectangular piece of metal from a larger source of metal. Also, the fact that the amount of material 34 that is removed from the pivotal end 15 of the blade 10 is substantially reduced in thickness from the normal thickness of the blade, it can be seen that the material lost in the formation of the hole is practically insignificant and is a great saving over the material that might have been lost by cutting the hole 25 from the blade in its normal thickness.

While a blade having a single cutting area on one end has been shown and described, it should be understood that the method disclosed herein can be applied to blades of any configuration, including blades with a centrally located hole and multiple cutting areas on each end.

It will be obvious to those skilled in the art that many variations may be made in the embodiments chosen for the purpose of illustrating the present invention without departing from the scope thereof as defined by the appended claims.

What is claimed as invention is:

1. A method of forming rotary cutter blades for a rotary mower comprising cutting elongated straps of metal from a larger piece of metal, bending each strap at two positions intermediate its ends in such a manner as to form parallel end portions, sharpening at least one edge of one of said end portions of each strap, forging the other of said end portions of each strap in a circular area thereof displaced from the end and edges of the strap to reduce the thickness of the strap in the circular area while enlarging the width of the strap about the circular area and orienting the grain of the strap about the circular area, and subsequently cutting away the portion of each strap in its circular area.

2. A method of forming a rotary cutter blade of the type utilized in a rotary mower comprising, sharpening an edge of an elongated strap of metal at one of its ends, forging a circular area of the strap of metal adjacent the other end and intermediate its edges until the thickness of the strap of metal in the circular area has been reduced and the width of the strap of metal about the circular area has been enlarged, and cutting away the metal in the circular area.

3. A method of forming a rotary cutter blade or the like comprising simultaneously reducing the thickness of a metal strap in an area located adjacent one end of the strap and intermediate the edges of the strap and enlarging the width of the strap about the area of reducing thickness, and subsequently removing the area of reduced thickness from the strap.

4. The invention of claim 3 wherein the steps of reducing the thickness of the strap and enlarging the width of the strap comprise forging the strap in said area so as to force the metal in said area into the portion of the strap surrounding said area, thereby orienting the grain of the strap adjacent the area in a generally semi-circular fashion about the area.

References Cited

UNITED STATES PATENTS 1,486,365  3/1924  Cummings _____ 72—338

RICHARD J. HERBST, *Primary Examiner.*

E. SUTTON, *Assistant Examiner.*